J. DAIN.
HAY RAKE.
APPLICATION FILED APR. 13, 1908.
1,141,695.
Patented June 1, 1915.
5 SHEETS—SHEET 1.
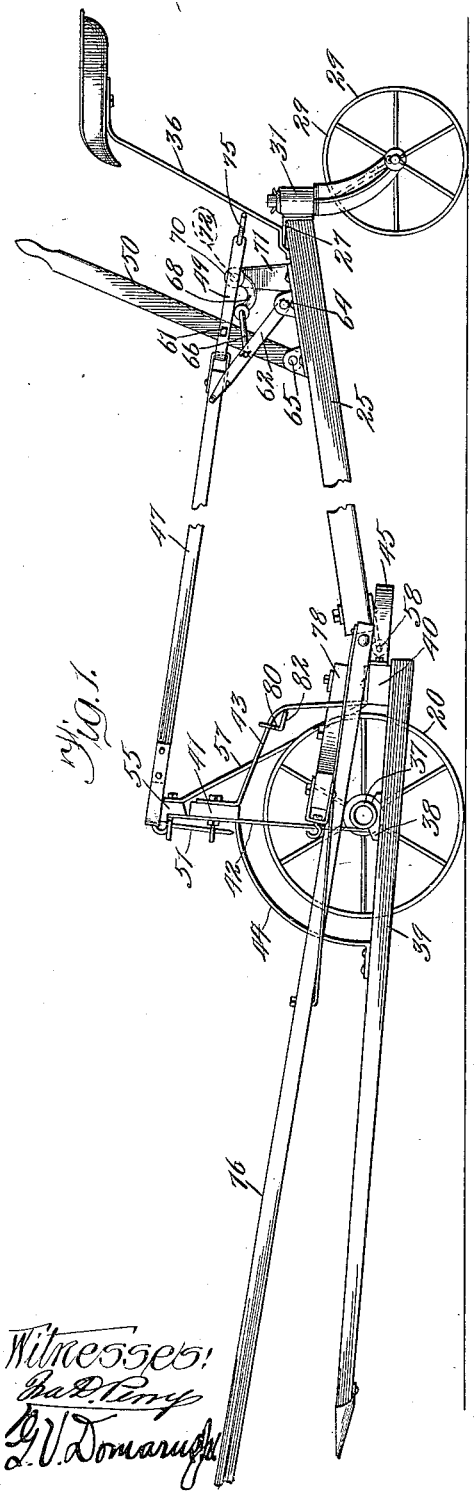
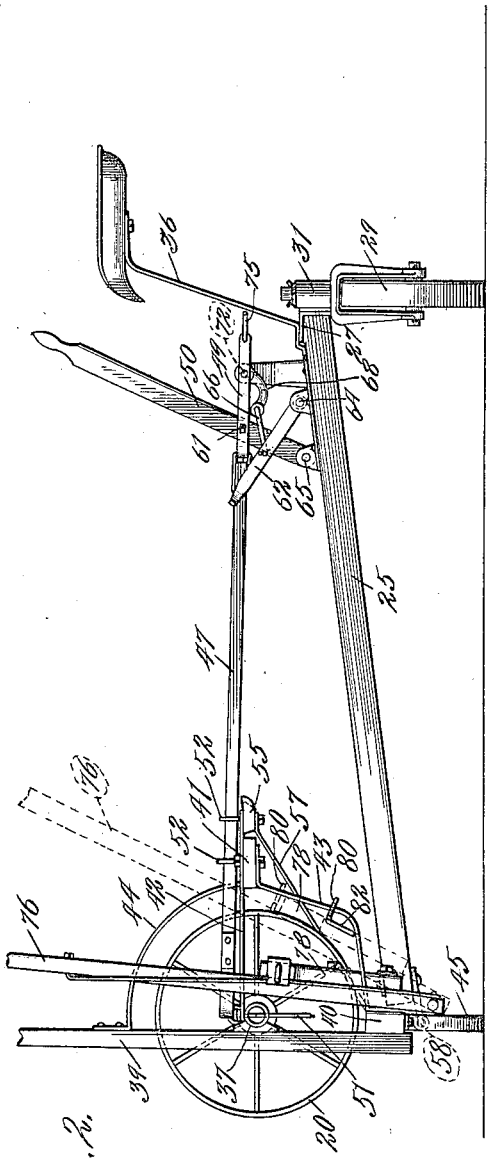

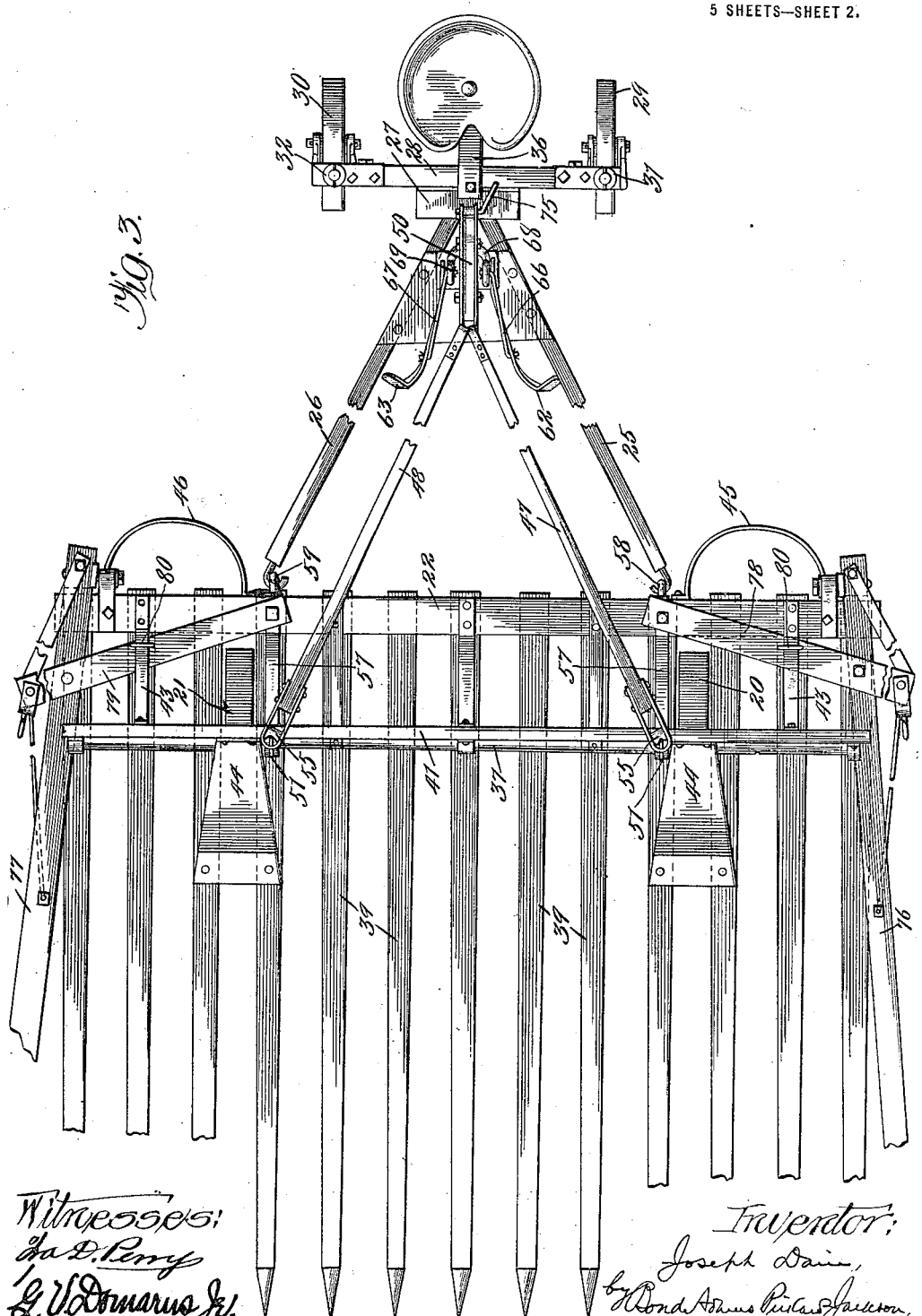

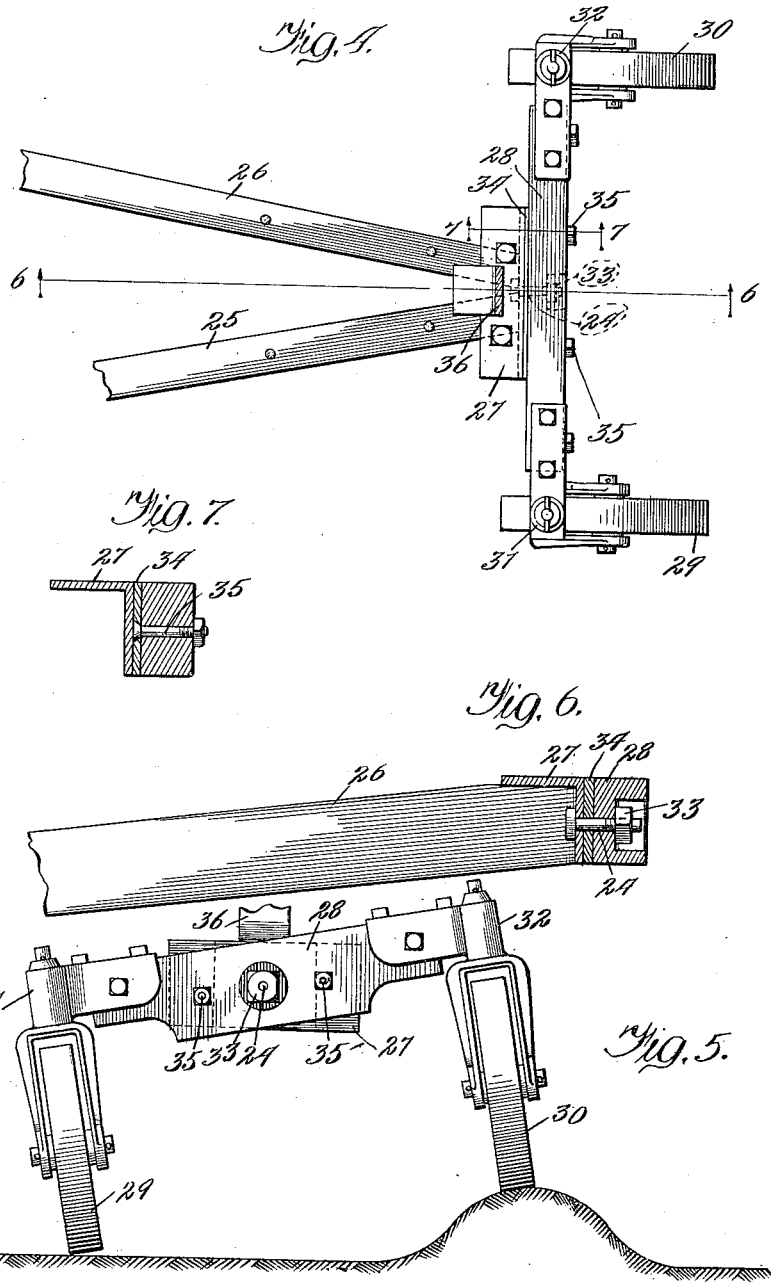

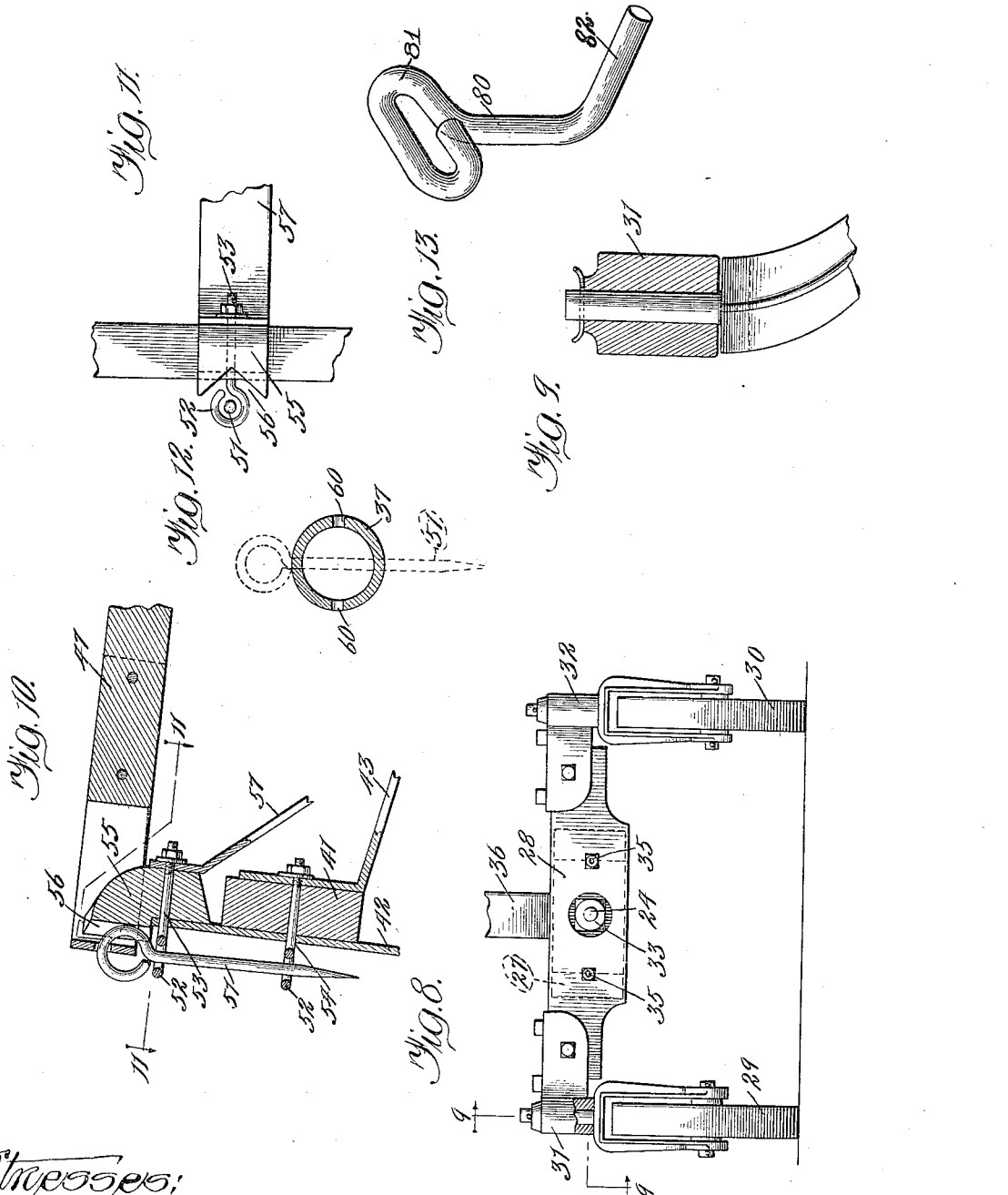

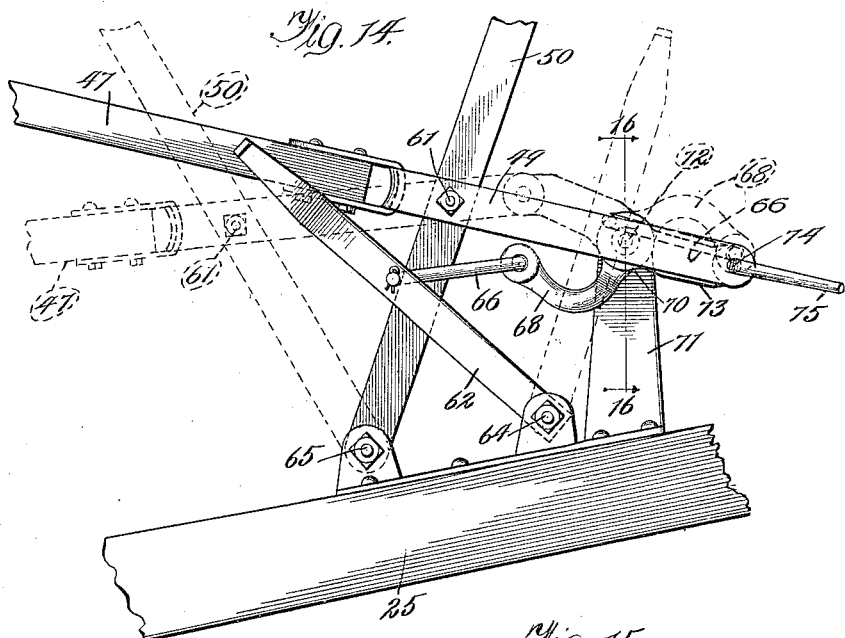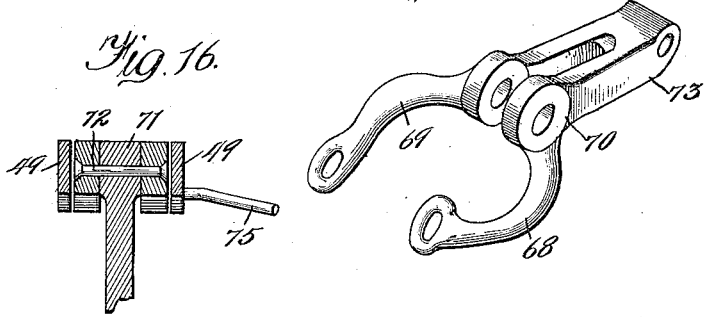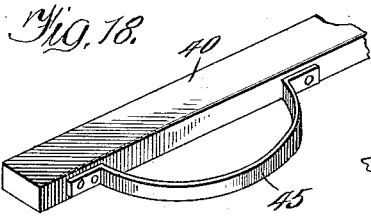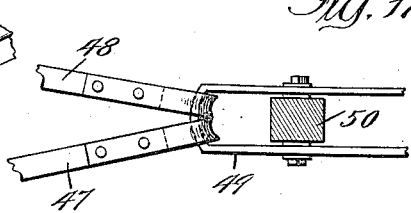

UNITED STATES PATENT OFFICE.

JOSEPH DAIN, OF OTTUMWA, IOWA, ASSIGNOR TO DAIN MANUFACTURING COMPANY OF IOWA, OF OTTUMWA, IOWA.

HAY-RAKE.

1,141,695.  Specification of Letters Patent.  Patented June 1, 1915.

Application filed April 13, 1908. Serial No. 426,817.

*To all whom it may concern:*

Be it known that I, JOSEPH DAIN, a citizen of the United States, residing at Ottumwa, in the county of Wapello and State of Iowa, have invented certain new and useful Improvements in Hay-Rakes, of which the following is a specification, reference being had to the accompanying drawings.

My invention relates to hay-rakes, and has particularly to do with side-hitch sweep rakes the frames or carriages of which are supported at three points; said rakes being usually termed "three-wheel" rakes from the fact that they are supported by three wheels one at each end of the rake-head and one at the rear of substantially the central line of the implement. Such rakes as heretofore constructed have been objectionable for the reason that the seat of the rider being immediately over, or in line with, the rear wheel, the rider is subjected to severe jolting and straining caused by the inequalities in the ground. Moreover, the operation of the machine is interfered with, since, when one of the front wheels goes over a bump or elevation when the rake-teeth are loaded, there is quite a tendency of the caster-wheel to turn around, which is magnified if the horse on the raised side pulls a little faster than the other. These objections have seriously handicapped the demand for and manufacture of such so-called "three-wheel" rakes, and one of the objects of my invention is to avoid such objections and to provide a rake of the type above referred to, in which the points of support are disposed substantially triangularly, but in which provision is made for neutralizing to a great extent the effect of inequalities in the ground.

Another object of my invention is to provide an improved construction of folding rake, *i. e.* a rake in which the rake-head is adapted to be turned up to a more or less nearly vertical position to enable the rake to be moved laterally through gates, along narrow lanes, or across culverts, etc., by which the objections incident to the use of wheels for supporting the rake-head when folded are avoided; also to provide certain other improvements in rakes of this type, as will be hereinafter pointed out.

I accomplish these objects as illustrated in the drawings and as hereinafter described.

What I regard as new is set forth in the claims.

In the accompanying drawings,—Figure 1 is a side elevation of my improved rake, some parts being broken away; Fig. 2 is a side elevation, showing the rake-head in its folded position; Fig. 3 is a plan view, some parts being broken away; Fig. 4 is a partial plan view, illustrating the rear portion of the machine; Fig. 5 is a partial rear elevation; Fig. 6 is a detail, being a section on line 6—6 of Fig. 4; Fig. 7 is a detail, being a section on line 7—7 of Fig. 4; Fig. 8 is a partial rear elevation, showing the parts in a different position from that shown in Fig. 5; Fig. 9 is a section on line 9—9 of Fig. 8; Fig. 10 is an enlarged detail, being a vertical sectional view of a part of the rake-head; Fig. 11 is a sectional view on line 11—11 of Fig. 10; Fig. 12 is a cross-section of the axle; Fig. 13 is a perspective view of one of the tongue latches; Fig. 14 is an enlarged detail, showing the arrangement of the levers for raising and lowering the points of the rake-teeth; Fig. 15 is a perspective view of one of said levers; Fig. 16 is a section on line 16—16 of Fig. 14; Fig. 17 is a detail, partly in section, showing the connections of the braces or pull poles; and Fig. 18 is a perspective view, illustrating one of the runners which support the rake-head when in its folded position.

Referring to the accompanying drawings for a description of the embodiment of my invention therein illustrated, it will be observed that the rake as a whole is in effect supported at three points,—wheels 20—21 being provided near the opposite ends of the rake-head 22, and a pivotal support 23 being provided centrally at the rear of the frame, as shown at 24 in Figs. 5, 6 and 8, and as also shown in dotted lines in Fig. 4. As shown in Fig. 4, the rear portion of the frame of the rake is composed of members 25—26 arranged in V shape, the apex of the frame being at the rear, and the rear end portions of said members 25—26 are connected by a transverse plate 27, preferably of angle-iron, which is secured to said members, as shown in Figs. 4 and 6,—said plate 27 serving as a support for the pivot 24, as best shown in Fig. 6.

The pivot 24 serves as a means of connecting the rear end portion of the frame with a transverse bar or cross-head 28 which is comparatively short and carries at its ends caster-wheels 29—30, as shown in Fig. 4,—said caster-wheels being journaled in suitable bearings in brackets 31—32 secured to the end portions of said bar 28, as shown in Fig. 5.

33 indicates a nut which fits upon the pivot-bolt 24 and serves to secure the parts together.

34 indicates a bearing-plate placed between the bar 28 and the angle-iron 27, as shown in Fig. 6,—said plate being secured to the bar 28 by bolts 35, as shown in Fig. 7, or other suitable means. The V-shaped frame and the wheeled support for the rear end of the frame composed of the cross-bar 28 and the caster-wheels carried thereby may oscillate independently of each other, so that the effect of the rising and falling of either of the caster-wheels as transmitted to the frame of the machine, or to the driver, whose seat is supported over the pivot 24, as shown in Figs. 3, 4 and 5,—in which 36 indicates the seat-support—is very much reduced or neutralized, and the same is true of the effect of the rising or falling of either of the rake-head-carrying wheels. My improved rake, therefore, operates much more smoothly, and with much less distress to the driver, than any prior construction of which I am aware.

Instead of making the pivot 24 separate from the frame, as shown, the construction may be varied, as any other suitable way of providing a pivotal connection between the rear portion of the frame and the transverse-bar or cross-head 28 may be employed. So far as this feature of my invention is concerned, it is designed more particularly for use in connection with sweep-rakes, such as that illustrated in the drawings and also illustrated and described in my pending application, Serial No. 205,735, filed April 30, 1904, in which the draft animals are disposed at opposite sides of the rake-head. I wish it to be understood, however, that this feature of my present invention is not limited in its application to rake-heads of the particular form and construction herein shown, or to arranging the team in the manner described, as they may be also applied to rakes of various other forms, as, for example, to those shown in my pending applications, Serial Nos. 203,393 and 203,395, filed April 16, 1904.

Another important part of my invention has to do with the arrangement of the rake-head in connection with the supports therefor when in operative position and also when in inoperative or folded position, and in connection also with the frame of the rake. These features are best shown in Figs. 1, 2, 3, 10, 11 and 12. As shown in Figs. 1 and 3, the rake-head is supported upon the carrying-wheels 20—21, which are mounted upon a tubular axle 37,—such axle being non-rotatably secured upon suitable blocks 38 carried by the rake-teeth 39. (See Fig. 1). As shown in Fig. 3, the axle 37 extends transversely of the rake-teeth near their rear ends,—the wheels being preferably located between the third and fourth teeth from each end. The rake-head is made up of the rake-teeth, the axle 37 which unites them, a transverse bar 40, which connects the rear ends of the teeth together, an upper frame comprising a transverse bar 41 extending transversely of the rake-teeth and lying over the axle when said axle is in its normal position, and braces 42—43, which secure the bar 41, respectively, to the axle and to the bar 40.

44 indicates fenders or guards for the wheels, which are secured at their upper ends to the transverse bar 41 and at their lower ends to certain of the rake-teeth, as shown in Figs. 1, 2 and 3.

45—46 indicate runners, which are best made of steel strips bent in the form of a bow and secured at the rear of the transverse bar 40 near the opposite ends thereof, as shown in Figs. 1 and 3. Said bars extend in a plane substantially parallel with that of the rake-teeth, as shown in Fig. 1, and preferably lie slightly above the rake-teeth, as shown. The arrangement is such that when the rake-teeth are turned to a vertical position, as shown in Fig. 2, the rake-head is supported upon the runners 45—46 and may then be moved in a line at right-angles to that in which the wheels 20—21 move,—the wheels at that time being lifted off the ground, as also shown in Fig. 2. The caster-wheels 29—30, which support the rear of the rake-frame, may, of course, turn into a position parallel with the runners 45—46, so that the entire rake may then be moved in a direction at right-angles with the normal line of movement of the machine, thus adapting the machine to be moved along narrow lanes, through gates, or across culverts, etc.

When the rake-teeth are in their normal position, the rake-head is held in proper position by means of diverging brace-rods or pull-poles 47—48 which come together at their rear ends, as shown in Figs. 3 and 17 and are connected by a yoke or frame 49 which also connects them with an operating lever 50, through which they may be moved backward and forward to regulate the height of the points of the rake-teeth from the ground. As shown in the drawings, said yoke is in the form of the letter U, the inclosed end being in front of the hand-lever, and the rear ends of the pull-poles are connected to said yoke by similar loops or straps bent in the form of the letter U and bolted to the top and bottom of the pull-poles. I thus provide a flexible connection which permits the rake-teeth to rise as their points pass over obstructions while the hay is being gathered. The forward ends of the pull-poles are connected to the rake-head, when the latter is in either of its positions, by means of pins 51 which are pivotally connected at their upper ends to said pull-poles, as shown in Fig. 10, and are adapetd to pass through the eyes 52 of eye-bolts 53—54 secured at the upper portion of the rake-head, as shown in Figs. 1 and 10. The eye-bolts 54 pass through the upper ends of the braces 42 and the transverse bar 41,—their eyes lying in front of the braces 42. The eye-bolts 53 pass through the upper ends of the braces 42, through guide-blocks or castings 55 and through the upper ends of the braces 57,—the eyes of said bolts 54 being in front of said braces 42. The blocks 55 are grooved in their forward faces, as shown at 56 in Figs. 10 and 11, to receive the upper ends of the pins 51. The object of using the blocks or castings 55 is to provide bearings for the eyes formed at the upper ends of the pins 51, so that when power is applied in lifting the points of the rake-teeth it is imparted to the rake-head through said eyes pressing against the castings, thus avoiding danger of bending the pins, which would be apt to occur if the pulling strain were sustained directly by said pins without lateral support. The braces 57 extend downward and rearward from the blocks 55 and are secured to the transverse bar 40, as shown in Fig. 1.

The transverse bar 40 is hinged to the diverging members 25—26 of the frame by hinges 58—59, as shown in Figs. 1 and 3. When the parts are in the position shown in Fig. 1, the pull-poles or braces 47—48, through their connection with the upper portion of the rake-head, serve to keep the rake-head from rocking except as it is rocked by operating the lever 50 to elevate or depress the points of the rake-teeth. When the rake-head is so rocked, it turns about the axle 37 as an axis. By releasing the pull-poles or braces 47—48 from the rake-head, which may be accomplished simply by lifting the pins 51 out of engagement with the bolts 53—54, the rake-head may then be swung upward about the hinges 58, thereby raising the wheels from the ground and allowing the rake-head to rest on the runners 45—46. When turned to this folded position, the rake-head may be secured by means of the pull-poles or braces 47—48,—this being accomplished by passing the pins 51 through suitable perforations provided in the axle 37, as best shown in Fig. 12. The axle is there shown in full lines in its normal position, 60 indicating the holes provided for the pins 51. When the rake-head is turned to its folded position, the effect is to turn the axle 37 through an arc of 90° and bring the perforations 60 into position to receive the pins 51 which occupy the position shown in dotted lines in Fig. 12 and in full lines in Fig. 2. It will thus be seen that the pull-poles 47—48 serve to hold the rake-head in proper position either when in normal or operative position or when folded.

As shown in Fig. 14, the lever 50 is pivoted at its lower end upon the braces 25—26 and is connected intermediately with the yoke 49 by a bolt 61, so that by throwing said lever backward or forward the points of the rake-teeth may be raised or lowered. Suitable foot-lever mechanism is also provided consisting of foot-levers 62—63, shown in Fig. 3, which are pivotally mounted at their lower ends upon a pivot 64, as shown in Fig. 14,—said pivot being placed back of the pivot 65 of the lever 50. The foot-levers 62—63 extend forward from their pivot so that their upper ends lie in convenient position to be operated by the driver, and are connected intermediately by links 66—67, shown in Figs. 3 and 14, with the forward ends 68—69 of a bifurcated lever 70, shown in Fig. 15. Said lever is fulcrumed between its ends upon a suitable standard 71, being secured thereto by a pivot 72, as shown in Fig. 16. The rear-end portion 73 of the lever 70 is pivotally connected by a pivot 74 with the yoke 49, as shown in Fig. 14.

When the rake-teeth are elevated, or are in the position they occupy when carrying a load of hay, the hand and foot levers are in the position shown in full lines in Fig. 14, at which time it will be observed that pivot 72 is in line with or slightly above a line intersecting pivots 61 and 74, so that there is a substantial lock of the rake-teeth in their carrying position. The same is true when the rake-head is in its folded position, as shown in Fig. 2. When, however, the points of the rake-teeth are nearest the ground, or in loading position, the levers are in the position shown in dotted lines in Fig. 14, and a line intersecting the points at which the links 66—67 connect with the levers 62—63 and with the arms 68—69 is somewhat below the axis of the lever 70. When it is desired to lower the points of the rake-teeth the hand and foot levers are released by slightly lifting the rear end of the yoke 49, for which purpose a projecting-rod 75 is provided, best shown in Figs. 14 and 16. Said rod extends conveniently so that the operator may engage it with his toe so as to lift the yoke, thereby swinging the arms 68—69 downward and allowing the weight of the points of the teeth to cause them to tip downward.

76—77 indicate the usual tongues with which the team are connected, and 78—79 draft-devices to which they are hitched. When the rake-head is in its folded position, the tongues 76—77 are swung over to the position shown in dotted lines in Fig. 2 and are then held in position by latches 80, best shown in Figs. 2 and 13. Said latches are in the form of bars of any suitable material bent at right-angles, as shown in Fig. 13, and provided with eyes 81 which are adapted to fit upon the braces 43, as shown in Fig. 2, so that the bent portion 82 of said latches may overlie the adjacent portions of the draft-deveices 78—79, as shown in dotted lines in Fig. 2. As the tongues are hinged to the rake-head, when the rake is in its folded position, the tongues will drop back until the draft-bars come into contact with some part of the rake-head when, in case one of the wheels should rise over quite an obstruction, or if the rake were being transported on a hillside, the tongue on the higher side would swing back, and as it has considerable travel, it would be apt to wrench the rake badly by swaying back and forth. The latches are provided to hold the tongues in one position when the rake is folded and prevent side movement thereof. In operation the latch is lifted up, then the tongue is pushed back into position and the latch dropped down over the draft-bar connected to the tongue, as indicated by dotted lines in Fig. 2.

My invention is not to be restricted to the specific details of the construction illustrated and described, except in so far as they are particularly claimed, as my invention includes generically the subject-matter of the broader claims.

That which I claim as my invention, and desire to secure by Letters Patent, is,—

1. The combination of a rake-head having raking-devices, carrying-wheels therefor, a frame extending rearwardly from said rake-head, and pivotally connected therewith wheels supporting said frame at the rear, vertically rocking means connecting said rear wheels with said frame, and draft-devices connected directly with said rake-head.

2. A rake, comprising a rake-head having rake-teeth and an upper frame, said rake-head being adapted to be rocked so that the rake-teeth assume a substantially vertical position, means carried by the rake-head for supporting the same when in the latter position, wheels supporting said rake-head when in its normal position, a rake-frame extending rearwardly from said rake-head, one or more caster-wheels supporting said rake-frame at the rear, and means connected with the rear portion of said rake-frame and adapted to positively engage the upper frame of said rake-head for holding the rake-teeth in either their normal or in their substantially vertical position.

3. A rake, comprising a rake-head having rake-teeth and an upper frame, said rake-head being adapted to be rocked so that the rake-teeth assume a substantially vertical position, one or more runners carried by said rake-head and projecting rearwardly therefrom in a plane substantially parallel with the plane of the rake-teeth, wheels supporting said rake-head when in its normal position, a rake-frame extending rearwardly from said rake-head, one or more caster-wheels supporting said rake-frame at the rear, and means connected with the rear portion of said rake-frame and adapted to positively engage the upper frame of said rake-head for holding the rake-teeth in either their normal or in their substantially vertical position.

4. A rake, comprising a rake-head having rake-teeth and an upper frame, one or more runners carried by said rake-head and projecting rearwardly therefrom in a plane substantially parallel with the plane of the rake-teeth, wheels supporting said rake-head when in its normal position said rake-head being adapted to be rocked so that the rake teeth assume a substantially vertical position, one or more caster-wheels supporting said frame at the rear, and one or more pull-poles connected with the rear portion of said frame and with the upper portion of said rake-head for bracing said parts, said pull-holes having means for securing the rake-head when the rake teeth are in substantially vertical position.

5. A rake, comprising a rake-head having rake-teeth and an upper frame, one or more runners carried by said rake-head and projecting rearwardly therefrom in a plane substantially parallel with the plane of the rake-teeth, wheels supporting said rake-head when in its normal position said rake-head being adapted to be rocked so that the rake-teeth assume a substantially vertical position, an axle, one or more caster-wheels supporting said frame at the rear, and one or more pull-poles connected with the rear portion of said frame and with the upper portion of said rake-head for bracing said parts, said pull-holes having means for engaging the axle of the rake-head to hold the rake-teeth in substantially vertical position.

6. A rake, comprising a rake-head having rake-teeth and an upper frame, wheels supporting said rake-head when in its normal position, a rake frame connected with said rake-head and extending rearwardly therefrom, one or more caster-wheels supporting said rake frame at the rear, a hand-lever mounted on said rake frame, one or more pull-holes connected with the upper frame of said rake-head, one or more foot-levers mounted on said rake frame, and a lever pivotally mounted between its ends upon said rake frame and connected at one end with said foot-levers and at the other end with said pull-holes.

7. A rake, comprising a rake-head having rake-teeth and an upper frame, wheels supporting said rake-head when in its normal position, a rake frame connected with said rake-head and extending rearwardly therefrom, one or more caster-wheels supporting said rake frame at the rear, a hand-lever mounted on said rake frame, one or more pull-holes connected with the upper frame of said rake-head, one or more foot-levers mounted on said rake frame, and a lever pivotally mounted between its ends upon said rake frame and connected at one end with said foot levers and at the other end with said pull-holes at a point at the rear of the connection of said pull-holes with said hand-lever.

8. A rake, comprising a rake-head having rake-teeth, wheels supporting said rake-head when it is in its normal position, a frame extending rearwardly from said rake-head and pivotally connected therewith so that said rake-head is adapted to be turned to a substantially upright position, means supporting the rake-head when it is in the latter position, a caster wheel supporting said frame at the rear, a pull-pole connected with said rake-head, and hand and foot levers carried by said frame and connected with said pull-pole for rocking said rake-head to raise and lower the points of the rake-teeth when the rake-head is in a substantially horizontal position, said pull-pole having means operating to engage and lock the rake-head in a substantially upright position.

9. A rake, comprising a rake-head having rake-teeth, wheels supporting said rake-head when it is in its normal position, a frame extending rearwardly from said rake-head and pivotally connected therewith, whereby said rake-head is adapted to be turned to a substantially upright position, a caster-wheel supporting said frame at the rear, a pull-pole connected with said rake-head, hand and foot levers carried by said frame and connected with said pull-pole for rocking said rake-head to raise and lower the points of the rake-teeth, means co-acting with said hand and foot levers for locking said rake-teeth in carrying position, said pull-pole being adapted to engage and lock the rake-head in its substantially upright position, and means for supporting said rake-head when in the latter position.

10. A rake, comprising a rake-head having rake-teeth, said rake-head being adapted to be rocked to carry the rake-teeth into a substantially upright position, means for supporting said rake-head when in the latter position, wheels supporting said rake-head when in its normal position, a frame extending rearwardly from said rake-head, tongues at opposite sides of said rake-head, and means carried by the rake-head for locking said tongues up out of operative position when the rake-teeth are in a substantially upright position.

JOSEPH DAIN.

Witnesses:
C. A. LASSER,
W. G. DUFFIELD.

Copies of this patent may be obtained for five cents each, by addressing the "Commissioner of Patents, Washington, D. C."